United States Patent [19]

Buchholz et al.

[11] 3,766,326

[45] Oct. 16, 1973

[54] DUAL RECORDING AND REPRODUCING APPARATUS HAVING TWO ENDLESS TAPES AND COMMON DRIVE MEANS

[76] Inventors: James J. Buchholz, 2411 Euston Road, Winter Park 32789; Edward E. Peyton, 220 Glen Oaks Avenue, #102 Temple Terrace, Tampa 33617, both of Fla.

[22] Filed: Aug. 9, 1971

[21] Appl. No.: 169,913

[52] U.S. Cl. .................................... 179/100.2 Z, 179/100.1 DR, 179/100.2 D

[51] Int. Cl. ......................... G11b 15/02, G11b 5/48

[58] Field of Search .............. 179/100.2 Z, 100.2 D, 179/100.1 DR

[56] References Cited

UNITED STATES PATENTS

| | | | |
|---|---|---|---|
| 2,914,752 | 11/1959 | MacDonald | 179/100.2 Z |
| 2,988,604 | 6/1961 | Nye | 179/100.2 Z |
| 3,024,320 | 3/1962 | Nye | 179/100.2 D |
| 3,041,417 | 6/1962 | Stroud et al. | 179/100.2 Z |
| 3,418,432 | 12/1968 | Boggs et al. | 179/100.1 DR |
| 3,467,790 | 9/1969 | Bolick | 179/100.1 R |
| 2,989,594 | 6/1961 | McKaig | 179/100.2 Z |

*Primary Examiner*—Vincent P. Canney
*Assistant Examiner*—Robert S. Tupper
*Attorney*—Robert W. Duckworth et al.

[57] ABSTRACT

An endless tape recording and reproducing apparatus is provided having a pair of remote dictating units and a pair of remote transcribe units adapted to actuate an integrated dual endless tape unit. Each endless tape has a separate bin along with its own dictate and transcribe controls but each is driven by the same motors driving forward and reverse shafts for each side, and each dictate station and each transcribe station can operate either of the endless tapes. The apparatus utilizes a combination erase magnet adapted to operate a reed switch to provide two functions for the erase magnet and utilizes photo cells to indicate conditions of the endless tape. A new system for adjusting solenoid actuated pinch rollers is also provided along with a new layout path for each endless tape.

12 Claims, 7 Drawing Figures

INVENTOR
JAMES J. BUCHHOLZ
EDWARD E PEYTON
BY Duckworth & Hobby
ATTORNEY

INVENTORS
JAMES J. BUCHHOLZ
EDWARD E. PEYTON
BY Duckworth & Hobby
ATTORNEY

INVENTORS
JAMES J. BUCHHOLZ
EDWARD E. PEYTON
BY Duckworth & Hobby
ATTORNEY

DUAL RECORDING AND REPRODUCING APPARATUS HAVING TWO ENDLESS TAPES AND COMMON DRIVE MEANS

BACKGROUND OF THE INVENTION

The present invention relates to endless tape dictation equipment for recording and reproducing from remote dictate and transcribe units and especially to such a system having the capability to dictate and transcribe from pairs of dictation and transcription units onto a pair of endless tapes, each unit being adapted to dictate or transcribe from either of the endless tapes.

In the past, various types of dictation equipment have been provided which utilized several mediums for recording and reproducing the human voice for use in dictation equipment. One common system uses magnetic tape or other flat surfaces covered with iron oxide or similar material, which can be selectively magnetized for storing and faithfully reproducing sound. Another type of dictation equipment uses records or discs which are cut in a selective manner to store dictation. In recent years the more common magnetic tape systems have begun utilizing endless tape units which can be activated from remote dictate units onto an endless belt or tape located in a central storage unit, and which endless tape can be operated from a transcribe unit at a secretary's desk whereby the secretary can start transcribing as soon as the dictation begins. One of the first units of this type is illustrated in the Nye U.S. Pat. No. 2,988,604 for Recording and Reproducing System which utilizes an endless tape feeding between a pair of bins from one bin to the other and is arranged to selectively actuate the tape in a forward or reverse direction for recording and transcribing the recorded message. This unit has been provided with improvements such as in U.S. Pat. No. 3,024,320 for a Dictating Machine Erasure Unit, and U.S. Pat. No. 3,209,974 for Storage Facilities for Ribbon-like Material. Endless tape units can also be seen in U.S. Pat. No. 2,989,594 for a Magnetic Tape Recording and Reproducing Machine, and in U.S. Pat. No. 3,347,432 for an Endless Tape Control Device, as well as in U.S. Pat. No. 3,467,790 for a Dictation-Transcription Device and in a great number of other U. S. patents directed towards improvements to these machines.

The present invention relates to endless tape dictation equipment which provides more versatility and which utilizes a series of new features especially adapted to make the apparatus easier to repair and maintain, as well as more reliable in operation over longer periods of time. It is accordingly one object of the present invention to provide two endless tapes, each of which can be operated by one or more remotely located dictation units and one or more remotely located transcribe units but both of which endless tapes have a common drive system and an integrated framework.

It is another advantage of the present invention to provide a new layout for each endless tape to provide greater flexibility and ease of operation of the system. Other advantages include a combination erase magnet for erasing each endless tape and a reed switch activated by the erase magnet; and reliable photo-cell units to indicate conditions of the endless tape; and finally, a simplified solenoid actuated tape drive which is easily adjustable by the rotation of a cylindrical solenoid plunger rod upon the loosening of a single locknut.

SUMMARY OF THE INVENTION

The present invention relates to recording and reproducing equipment and especially to dictation/transcription equipment utilizing a pair of endless magnetic tapes each of which can be operated by one or more remotely located dictation or transcription units. A framework has a pair of motors mounted thereon, one operating the transcription portion of the unit and the other operating the dictation portion of the unit, each of which motors drives both the forward and reverse capstans which capstans are adapted to drive both endless tapes simultaneously or selectively by the operation of the solenoid actuated pinch rollers pressing the tape to the capstans. Each dictate unit has a forward and reverse solenoid actuated pinch roller and each transcribe unit similarly has a forward and a reverse solenoid actuated pinch roller which are activated from the remote dictate and transcribe units by the operator of the units. Each endless tape has a single bin in which one portion of the bin provides storage for the tape ready to be recorded on which tape first passes through an erase magnet for erasing any recorded material or noise on the magnetic tape. This tape is then fed around a circuitous path over a magnetic recording head which includes in combination an erase and listen head portion. One side of the recording erase head has a solenoid driven pinch roller actuate on the endless tape in one direction while the other side has a solenoid actuated pinch roller for actuating the endless tape in a second or forward direction. When a dictater backs up the tape, the tape drops into a second portion of its bin and the erase magnet is allowed to drop from the slack in the tape which activates a reed switch for disabling the recording section until the tape has been pulled taut again. Recording on a tape in a forward direction allows the tape to fall into a position in the bin between the ends of the bin and remains there until transcribed from the transcription unit. However, when the tape falls, it allows a photocell unit to be actuated which in turn turns on a light on the transcribe unit immediately indicating that the recorded message is ready to be transcribed. The recorded portion of the endless tape which is to be transcribed may then be actuated by the transcriber by the forward and reverse pinch rollers actuating the tape on either side of a listening head. Once the tape is transcribed it falls back into the storage bin where it is ready to be reused. If all the tape in the tape ready portion of the bin has been utilized, it will pull that tape taut covering a photocell which will activate a warning buzzer in the dictater's unit and will shut off the unit from further operation on that particular tape. It should of course be realized that both sides of the machine operate in a similar manner and if one tape has been fully used, the dictater can switch over to the other endless tape of the central unit. The solenoid activated pinch rollers are attached to levers which swing on fulcrum pins each with one end having the pinch roller thereon and the other end connected by a pin to a rod which is in turn connected to the solenoid. The rod has a threaded end threaded into a nut connected to a cylindrical plunger rod for the solenoid so that the pinch roller can be adjusted by loosening a locknut and rotating the plunger rod in the solenoid to screw the nut up or down on the threads on the rod connected to the lever, thus providing a simplified adjustment over previous systems.

BRIEF DESCRIPTION OF THE DRAWINGS

Other objects, features and advantages of this invention will be apparent from a study of the written description and the drawings, in which.

DESCRIPTION OF THE PREFERRED EMBODIMENTS

Figure 1:
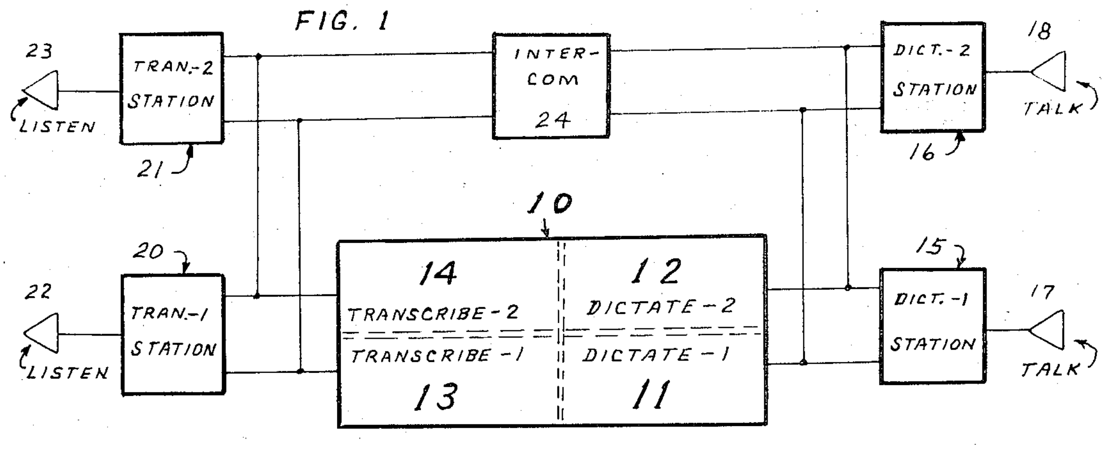
FIG. 1 is a block diagram of an overall operation of the present invention.

Referring now to FIG. 1, a block diagram is illustrated having a recording reproducing unit 10 with a first dictating unit 11 and a second dictating unit 12 along with a first transcription unit 13 and a second transcription unit 14. Both dictate units 11 and 12 are connecting to remote dictate stations 15 and 16 each of which dictate stations can operate either recording unit 11 or 12. Dictate station 15 has a mike 17 for receiving inputs and dictate station 16 has a mike 18 for receiving inputs. A pair of transcribe stations 20 and 21 are each connected to both reproducing sections 13 and 14 for receiving transcribed material from either unit and producing an output at 22 or 23. An intercom control unit 24 may also be provided with the system so that dictation system can be utilized as intercom system in an office whereby either dictater may talk through the system to the transcribing secretaries. Thus it can be seen at this point that a person operating the remote dictation control unit 15 could use the recording unit 11 while the remote dictating control unit 16 could utilize the recording unit 12, or alternatively, a single dictate station 15 could utilize recording unit 11 for routine dictation but could then switch to recording unit 12 for his priority dictation so that priority letters, or the like, could be dictated. Similarly, either transcribe station 20 or 21 can transcribe from the reproducing sections 13 and 14 interchangeably. Thus unusual flexibility is brought about in the overall combination as will be described in more detail.

Figure 2:
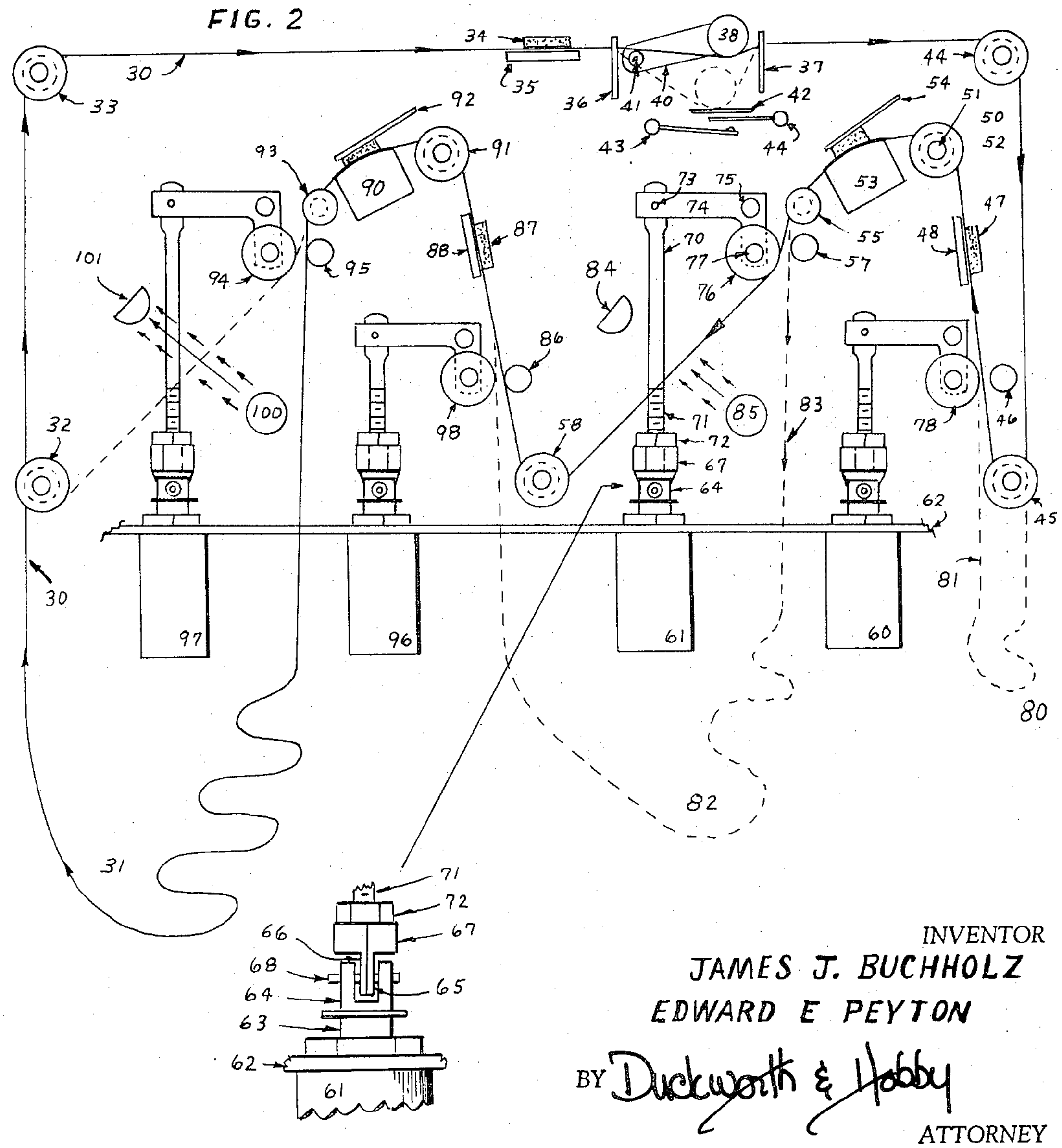
FIG. 2 is a side view of the operation of one endless tape unit of the recording/reproducing central station with parts removed for clarity of operation.
Figures 3, 4, 5:
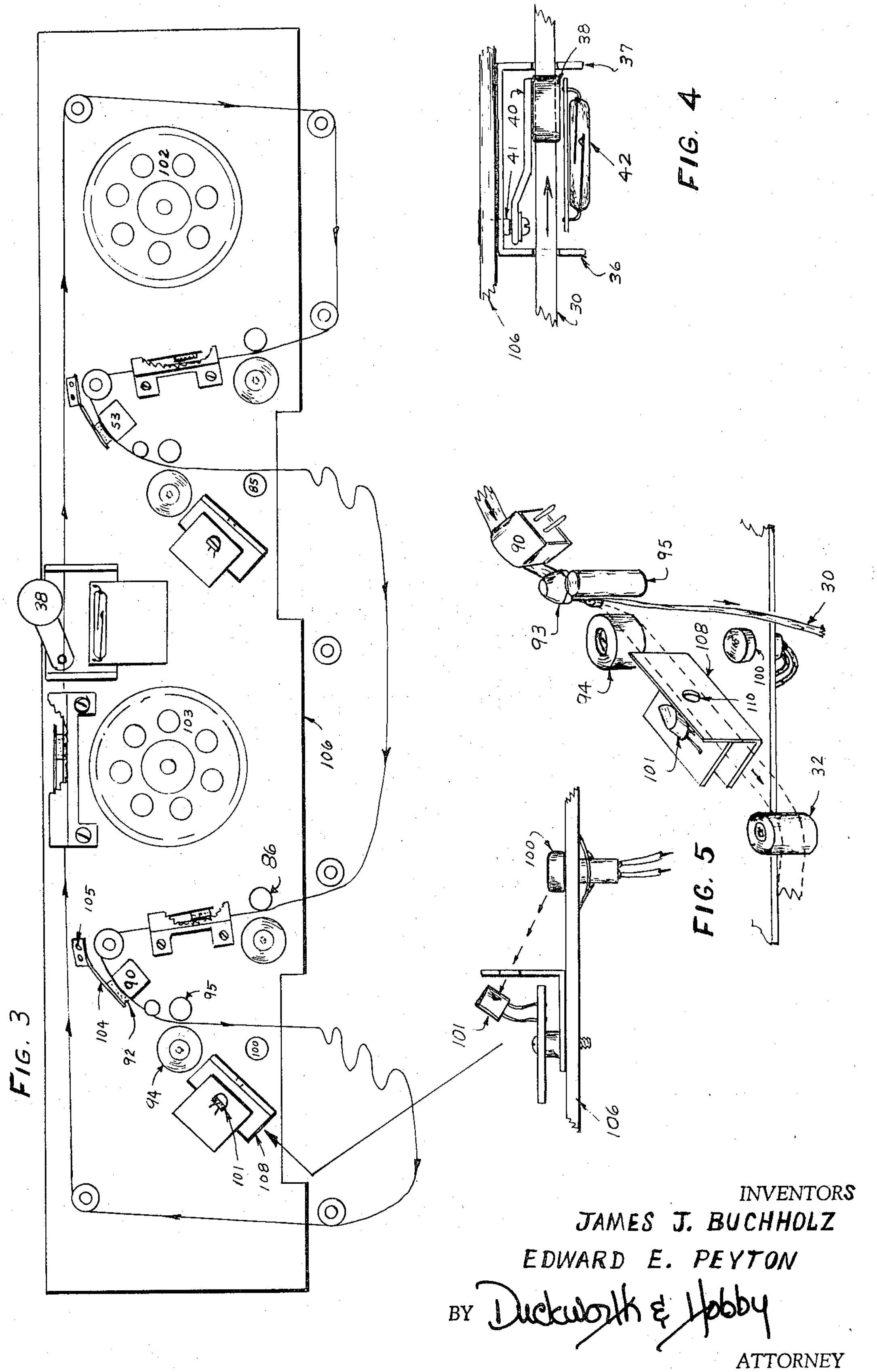
FIG. 3 is an upper side view of the embodiment of FIG. 1 showing the actual layout of one endless tape recording reproducing unit.
FIG. 4 shows a view of the erase magnet and reed switch combination.
FIG. 5 is a perspective view of the photocell unit illustrating its operation with the tape in two positions.

Turning now to FIGS. 2 and 3, side views of the operation of one endless tape recording reproducing system such as the first dictation and transcribe units 11 and 13 of FIG. 1 is illustrated, having an endless tape 30 located in a single large storage bin which tape is shown with arrows to illustrate the normal path of movement therethrough. Tape 30 begins in the tape ready to be recorded storage area 31 of the bin. This tape passes along a tape roller 32 around a second tape roller 33 and under a pressure pad 34 which presses down against the tape 30 which is riding on a metal bracket 35. Pressure pad 34 may be a felt pad and is used to keep the tape 30 taut at this point of the operation. The tape then passes through a pair of support brackets 36 and 37 and has a cylindrical shaped magnet 38 riding on the tape 30. Magnet 38 can of course be other shapes than cylindrical without departing from the spirit and scope of the invention and is connected to an arm 40 which is rotatably pinned by pin 41 to the frame so that when there is slack in the tape 30 at this point, the magnet 38 will force the tape down, as shown by the dashed lined. When the tape 30 is slack the magnet 38 drops into juxtaposition with a reed switch 42. The magnet 38 in its normal operation erases recorded material on the tape 30 to clear the tape for additional recording, but in its dropped position, operates to bring a pair of contacts 43 and 44 together in the reed switch. This can be accomplished in several ways depending upon the type of reed switch used and the polarity of the magnet so that the magnetic field can act on the magnetic material in contact 43 bringing it into contact with a fixed contact 44. Alternatively, it could be used to repel a flexible reed contact 44 into contact with the contact 43. Switch 42 indicates when there is slack in tape 30 at this point which indicates that a person dictating from one of the remote dictation units has reversed the tape to listen to what has been recorded. After the person dictating hangs up the handset, switch 42 disables the record head, so that recording cannot then be performed on this tape until the tape is moved forward again to bring the tape taut thereby lifting the magnet 38 into its upper or normal position shown. Thus the magnet 38 serves two purposes, first to erase the tape, and secondly to operate the reed switch 42 for disabling the recording head under predetermined conditions. Tape 30 continues around a tape roller 44 and then around tape roller 45 and over a capstan or drive shaft 46 and between a pressure pad 47 and its related metal bracket 48, which pressure pad operates in a similar manner to the pad 34. The endless tape 30 then continues around a tape guide roller 50 which rotates on a pin 51 and has an annular groove formed by the walls 52 for the tape 30 to roll on and to maintain the tape in the center of the roller 50 for alignment with the record head 53. Record head 53 also includes an erase head, erasing the tape prior to recording along with a listening head for listening to what has been recorded by backing the tape up and running it back through with the listening head activated. A pressure pad 54 maintains the tape taut over the record head 53. The tape 30 then rides in a tape guide roller 55 similar to but smaller than the roller guide 50 and then wraps around a pinch roller 56 which operates in conjunction with a second capstan or drive shaft 57. Tape 30 then continues around a tape roller 58 into the transcribe unit. The dictate portion of the recorder includes a reverse drive dictate solenoid 60 and a forward dictate solenoid 61 which solenoids are attached to a solenoid engaging bracket 62. Solenoids 60 and 61 are identical and have a cylindrical shaped plunger rod 63 which can be rotated within the solenoid 60 or 61. Each of the solenoid actuated pinch rollers of the present machine operates in the same manner, and accordingly only solenoid actuated pinch roller 61 is herein described. Each of the rods 63 has a yolk 64 attached thereto, which yolk has a clevis portion 65 for receiving a tongue 66 which is a part of a threaded unit 67. Tongue 66 is pinned to the yolk 64 by pin 68. A rod 70 has a threaded end portion 71 which is threaded into the nut 67 and locked with a locknut 72. The rod 70 is pinned with a pin 73 to an elbow shaped lever arm 74 which is fulcrummed on a shaft 75. Arm 74 has a pinch roller 76 rotatably attached to a shaft 77. Actuation of the solenoid 61 will pull the rod 63 into the solenoid thereby pulling the rod 70 in a downward motion, pulling the pin 73 which in turn pulls the arm 74 to rotate the arm 74 on pin 75 driving the pinch roller 76 against the tape 30 pressing the tape against the capstan 57 which in turn drives the tape 30 in its forward direction. Pinch roller 76 is sometimes called a clutch roller and typically may be made of rubber. The solenoid 60 operates in the same manner as solenoid 61 except for being located on the opposite side of the record head and driving the pinch roller 78 against tape 30 and against shaft 46 which drives the tape 30 in a reverse direction relative to the record head 53. Thus, a remote dictation unit can have activating switches to run the tape in a forward direction over the record head 53 erasing the tape 30, dictating or listening depending on which switches activate the solenoid 61. Similarly tape 30 can be reversed over the tape head 53 by activating solenoid 60 for reversing the tape 30 so that a portion of tape 30 that has been recorded can be listened to. Reversing the tape allows it to fall into a storage bin portion 80 as illustrated by the dashed line 81 and also allows the magnet 38 to drop, activating the reed switch 42 for blocking the operation of record portion of the record head 53 when the tape has been backed up with recorded material thereon and the person dictating from station 15 hangs up, it will prevent accidental erasure and re-record of that portion of the tape. Once material is recorded on the tape 30 it drops into a storage bin area 82 for holding fresh recorded material on the tape, as illustrated by the dashed line 83.

As soon as a dictater begins to dictate material at the remote dictation station, the endless tape 30 starts passing over the recording head and dropping into the bin portion 82 thereby removing the tape from in front of a photocell or light sensitive transistor and allowing light from a lamp 85 to reach the photocell 84 activating a switch which activates a lamp at the transcribe station indicating that material has been dictated and is ready to be transcribed. The lamp on the transcription unit will always advise a secretary when dictated material is ready for transcription as soon as dictation begins. It also will indicate on which of the endless tapes the dictation is occurring.

The endless tape 30 passes from the bin portion 82 in the transcribe portion of the unit over a capstan 86 and between a pressure pad 87 and a pad bracket 88 which pressure pad holds the tape taut over the listening head 90. The tape 30 passes over a guide roller 91 which is similar to the roller 50 and not only acts as a roller but guides or keeps the tape 30 aligned with the listening head 90. Listening head pressure pad 92 holds the tape taut onto the listening head and the tape passes a second guide roller 93 which is the same as guide roller 55 and also assists in aligning the tape 30 with the listening head. The tape then passes between pinch roller 94 and second capstan 95 and back into the bin portion 31 ready for re-use.

The transcribe portion of the unit has transcribe reverse solenoid 96 and transcribe forward solenoid 97, each of which works identical to the solenoid 61 which has already been described, and drives pinch rollers 94 and 98 respectively. Solenoid 96 drives pinch roller 98 against the drive 86 to reverse the tape so that the transcribe station can back up to re-listen to portions of tape 30 being transcribed. Solenoid 97 drives pinch roller 94 against drive shaft 95 to drive tape 30 on its forward direction. As already described in connection with solenoid 61, adjustment of these units merely requires rotating the cylindrical plunger in the solenoid after loosening a locknut to allow the rod 70 to be threaded into and out of the nut 67 and re-tightening the locknut 72. The transcribe station has a lamp 100 operating in connection with a photocell 101 which normally operates in a lightes condition because of the tape 30 dropping into the bin portion 31 out of the way of the photocell 101, but if all of tape 30 has been used in bin portion 31, as as by being dictated and dropped into bin portion 82, the tape 30 will be drawn taut around roller 32, and will block the light from lamp 100 from reaching the photocell 101 or light sensitive transistor, thereby actuating a buzzer alarm at the dictate unit indicating that all the tape on this particular endless tape has been utilized. It also deactivates or shuts off solenoid 61 so that the tape cannot be broken by the continuour forward pulling of the tape 30 when it has all been utilized. As soon as some tape can be transcribed from the portion 82 of the bin, tape will drop into bin portion 31 and removing the tape from blocking the light photocells.

The layout of the particular system as has been described for each endless tape unit ideally allows the tape 30 for three different functions to fall in three different parts of the bin and not to interfere with each other, thereby requiring only a single bin for each endless tape, while providing a great deal of flexibility to the system.

FIG. 3 shows a more nearly actual layout of the system of FIG. 2 and illustrates the location of the drive motor 102 for the dictate unit, and drive motor 103 for the transcribe portion of the unit. These motors may be any type desired but typically may be 1/100th HP electric motors operation on a 60 cycle AC 120 volt power source. The pressure pads 92 for the listening unit and pressure pad 54 for the record head are each held by small brass bracket 104 which is screwed into the frame by a pair of screws 105 so that heads 90 and 53 can be cleaned by loosening a single screw 105 for moving the pad out of the way, by swinging the bracket 104 to clear the head, and the replacing the screw 105. FIG. 3 also illustrates that the lamp 85 and lamp 100 are located in the frame member 106 and that the photocells may be any light sensitive transistors and transistor 107 is attached to a bracket 108 having an aperture 110 therein so that the light can be received through the aperture 110.

FIGS. 4 and 5 illustrate two additional views of the magnet switch system utilizing magnet 38 riding on the swingable arm 40 pinned with pin 41, riding on the tape 30, and in which the tape 30 rides on a pair of brackets 36 and 37.

Turning now to FIG. 5, a more detailed operation of the photocell units is illustrated in which a lamp 100 is placed directly in the frame member 106, which lamp may be commonly available, and long-life 28 volt lamps. An angle iron shaped bracket 108 has a light sensitive transistor 101 attached thereto and has an aperture 110 therein. Whenever the light from the lamp 100 can pass thorugh the aperture 110, the light sensitive transistor 101 will be activated to operate a switch. Transistor 101 has two conditions: a normally dark condition which is activated only when the tape falls out of the way such as illustrated with lamp 85 and photocell 84 of FIG. 2, or can have a normally lighted condition in which the lamp is always in view of the photocell 101 until the tape is pulled against the bracket 108 to block the aperture 110. The drive shaft 95 is operated by the pinch roller 94 and the roller 32 allows the tape to roll thereabout. This simple light operated unit has been found to be reliable, and provides a long lasting switch, requiring little maintenance and which maintenance can be easily accomplished.

Figure 6:
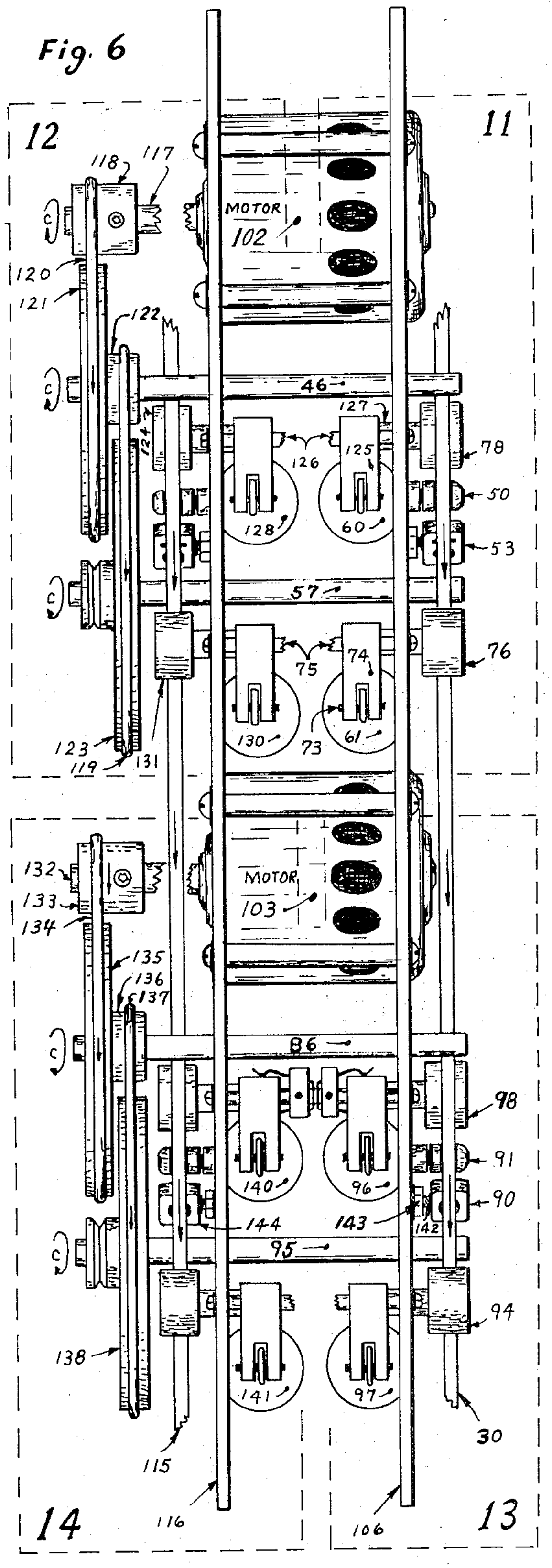
FIG. 6 is a top sectional view of the central recording reproducing system showing both endless tape units.

Turning now to FIG. 6, a top plan view of the system more clearly illustrates the integration of the units utilizing two endless tapes as described in FIG. 1, each of which side of the unit operates as described in connection with FIGS. 2 through 5. In this view, dashed lines have been drawn in to separate the first and second recording units 11 and 12 and the first and second transcription units 13 and 14. An endless tape 30 is illustrated on one side with an endless tape 115 on the opposite side. A pair of motor 102 and 103 are attached to a pair of frame members 106 and 116. Motor 102 drives a motor shaft 117 which in turn is connected to a pulley 118 for driving a rubber belt 120. The belt 120 turns an intermediate drive pulley 121 in a clockwise manner which intermediate pulley 121 has a similar pulley 122 thereon, and which in turn drives a main drive pulley 123. Pulley 121 drives a reverse drive shaft 46 which operates in connection with pinch roller 78 and 124 to drive the endless tapes 30 and 115 selectively against the shaft 46 for reversing the endless tapes at that point. Pinch roller 78 is actuated by solenoid 60 which actuates an elbow shaped arm 125, which pivots on a shaft 126 and has a fixed shaft 127 with the roller 78 rolling thereon. Activation of the solenoid 60 pulls bracket 125 around shaft 126 to drive the pinch roller 78 against the shaft 46 to reverse the tape 30. Solenoid 128 operates in exactly the same manner except for driving pinch roller 124 against the tape 115. As can be seen the shaft 46 rides in frame members 106 and 116. The tapes ride over the recording heads 53, and operate in the same manner for both sides as previously described for one side, for driving the tapes in a forward direction selectively with a solenoid 61 driving a pinch roller 76 for driving tape 30 against shaft 57, and a second solenoid 130 for driving second recording unit driving a pinch roller 131 against the shaft 57 for driving the tape 115 in a forward direction. Shaft 57 rides in bushings or bearings attached to the frame members 106 and 116. All of the solenoids work in a similar manner as has been described but are selectively operable to drive the dictating units 11 or 12 or transcribing units 13 or 14 in either a forward or reverse direction. Each has a pin 73 for pulling an arm 74 on a fulcrum shaft 75 for moving a roller 76 into contact with the shaft 57. The motor 103 operates in the same manner as described for motor 102 and drives a shaft 132 having a pulley 133 attached thereto for driving a rubber belt 134 for driving an intermediate pulley 135. The intermediate pulley has a smaller pulley 136 thereon for driving the rubber belt 137 for driving the main drive pulley 138 of the transcribe units. Pulley 135 drives reverse drive capstan 86 and pulley 138 drives the forward drive 95 of the reproducing side of the units. Reverse transcribe solenoid 96 and the forward transcribe solenoid 97 have already been described and a second set of reverse transcribe solenoids 140, operate in the same manner as solenoid 96, and a second transcribe forward solenoid 141 operates in the same manner as solenoid 97, each for driving pinch rollers against the shafts 86 and 95 for either a forward or reverse direction, similar to the operation of the pinch rollers 98 and 94. Listening head 90 is attached by threaded shaft 142 to a threaded nut 143 attached to the frame member 106 for adjusting a listening head as desired for correct operation of the tape 30 to ride thereover, and a second listening head 144 operates in the same manner as the listening head 90. Guide rollers 50 and 91 and their equivalents on the opposite side of the machine may also be seen in this view.

It should be clear to those skilled in the art at this point that two separate endless tapes are utilized, both units operated by a single motor for forward and reverse dictate and a second single motor for forward and reverse transcribe, and each operating on common shafts operated by common pulley system. The entire unit is mounted on a frame having members 106 and 107 for the shaft to ride in and which provides the actuating solenoids in the middle along with the motors and the operation of the unit outside of the side frame members 106 and 116.

Figure 7:
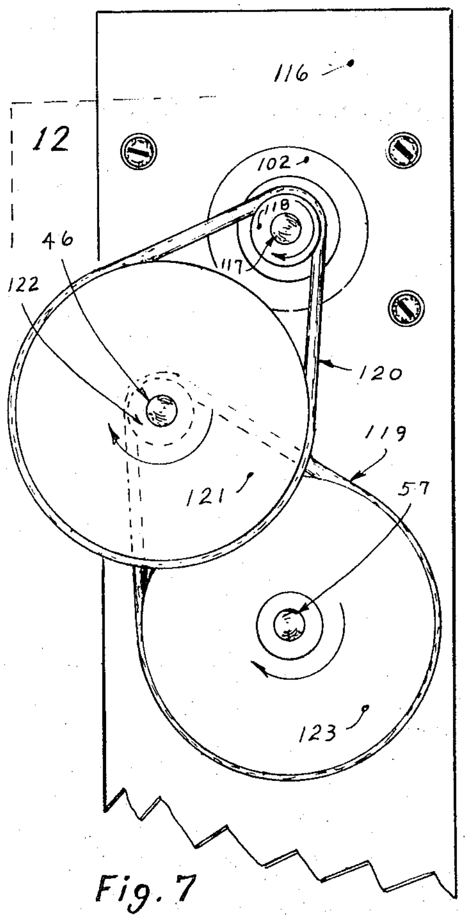
FIG. 7 illustrates the operation of the motor driving forward and reverse shafts.

The operation of the pulleys can be more clearly seen in FIG. 7 in which motor 102 riding on frame member 116 drives a shaft 117 which rotates a pulley 118 in a clockwise manner to drive a belt 120 which drives an intermediate or reverse shaft pulley 121 in a clockwise manner driving a shaft 46 having a second smaller pulley 122 thereon which drives a second rubber belt 119 which drives the main or forward pulley 124, which in turn drives the shaft 57 in a clockwise direction.

At this point, it should be clear that a novel dual endless tape for recording and reproducing has been provided for operation in connection with one or more remote dictation stations and one or more transcribe stations, and which provides many novel features but which is also adapted for use with many commercially available components such as commercial electric motors and solenoids, but having other features of which have been custom designed for the particular unit.

According, this invention is not to be construed as limited to the particular forms disclosed herein, since these are to be regarded as illustrative rather than restrictive.

I claim:

1. A dual recording and reproducing machine apparatus comprising in combination:

a. frame means having opposing sides;

b. a bin mounted on each of said opposing sides;

c. a pair of endless magnetic tapes, one tape associated with each said bin;

d. at least one transcribing means mounted on each of said opposing sides for reproducing information from the endless tape on that side;

e. at least one dictation means mounted on each of said opposing sides for recording information on the endless tape on that side;

f. a dictation drive motor mounted on said frame means;

g. common dictation drive means connected to said dictation motor driving each endless tape past said dictation means in forward and reverse directions;

h. a transcription drive motor mounted on said frame means;

i. common transcription drive means connected to said transcription drive motor for driving each endless tape past said transcribing means in forward and reverse directions;

j. a transcription control unit connected to said transcribing means and said common transcription drive means for activating a selected one of said transcription means to reproduce information from the endless tape associated therewith, and for activating the common transcription drive means to drive the endless tape associated therewith;

k. at least one remote transcription station means connected to said transcription control means; and l. at least one dictation control means connected to said dictation means and said common dictation drive means for activating a selected one of said dictation means to record information on the endless tape associated therewith and for activating the common dictation drive means to drive the endless tape associated therewith.

2. The apparatus according to claim 1 in which said dictation and transcription control units are connected to each other for use as intercom terminals for communication therebetween.

3. The apparatus according to claim 1 in which said dictation machine has a pair of transcribe control units each being adapted to selectively reproduce from either said endless tape.

4. The apparatus according to claim 3 in which each dictation machine has a pair of dictation control units each being adapted to selectively record or reproduce material onto either said endless tape.

5. The apparatus according to claim 4 in which each said dictation drive motor and each said transcribe drive motor drives a plurality of shafts rotatably mounted to said frame means and passing therethrough for driving each said endless tape in forward and reverse directions.

6. The apparatus according to claim 5 in which said frame means has a hollow center section having each said motor located therein with one of said endless tape located on either side of said frame and riding on tape rollers, and said frame also having record and reproducing heads mounted on either side thereof, each record head associated with said dictation means on that side and each reproducing head associated with said transcription means on that side.

7. The apparatus according to claim 6 in which each said endless tape runs from one end of each said bin over said transcribe and dictation units on the same side as each said tape, then doubles back through said dictation assembly, then through said transcribe assembly and back into said one end of said storage bin.

8. The apparatus according to claim 7 in which each said endless tape is adapted to fall into the middle portion of each said bin upon being recorded thereon from said dictation unit and into the other end of said storage bin when reversing said endless tape in said dictation assembly.

9. The apparatus according to claim 8 in which said dictation machine includes an erase magnet riding on each said endless tape for erasing material recorded on said tape at a predetermined location between said one end of said storage bin and said said dictation assembly as said tape moves from said bin to said dictation assembly, each said magnet being pinned to said frame means and adapted to drop when said endless tape becomes slack at said predetermined location.

10. The apparatus according to claim 9 further comprising:

a reed switch mounted on said frame means and positioned under said magnet;

circuit means between said switch and said dictation means for preventing recording thereon when said switch is actuated; and wherein said switch is actuated when said magnet drops due to slack at said predetermined location of said tape.

11. A magnetic tape mechanism for a tape recording and reproducing machine comprising in combination: a movable erase magnet adapted to ride on a taut section of magnetic tape in a tape recording and reproducing machine; guide means for guiding said erase magnet between a pair of predetermined positions, one postion being maintained by said magnetic tape being taut and the second position when said magnetic tape is slack allowing said erase magnet to drop to said second positions; a reed switch mounted on said mechanism adjacent to and below said erase magnet so that said magnet swings into juxtaposition therewith when said erase magnet is in said second position, said reed switch being actuated by the magnetic field of said magnet coming into juxtaposition therewith whereby said erase magnet may actuate said switch; and circuit means coupled with said switch for preventing recording when said switch is actuated.

12. The apparatus according to claim 11 in which said guide means includes an arm rotatably pinned to said recording and reproducing member at one end and having said erase magnet on the other end thereof.

* * * * *